US 7,640,661 B2

(12) United States Patent
Despreaux et al.

(10) Patent No.: US 7,640,661 B2
(45) Date of Patent: Jan. 5, 2010

(54) PROCESS FOR MANUFACTURING A REINFORCING LEADING OR TRAILING EDGE FOR A FAN BLADE

(75) Inventors: Jean-Louis Despreaux, Paris (FR); Jean-Michel Franchet, Paris (FR); Philippe Joffroy, Viarmes (FR); Gilles Klein, Mery sur Oise (FR); Stéphane Leveque, Massy (FR); Daniel Lhomme, Bessancourt (FR); Alain Lorieux, Sannois (FR)

(73) Assignee: Snecma, Paris (FR)

( * ) Notice: Subject to any disclaimer, the term of this patent is extended or adjusted under 35 U.S.C. 154(b) by 419 days.

(21) Appl. No.: 11/071,293

(22) Filed: Mar. 4, 2005

(65) Prior Publication Data
US 2005/0278950 A1 Dec. 22, 2005

(30) Foreign Application Priority Data
Mar. 8, 2004 (FR) .................................. 04 50466

(51) Int. Cl.
*B21D 53/78* (2006.01)
*B23K 20/00* (2006.01)
*B63H 1/26* (2006.01)

(52) U.S. Cl. .............. 29/889.7; 29/889.72; 29/889.721; 228/193; 228/265; 416/224; 416/241 R

(58) Field of Classification Search ................. 29/889.7, 29/889.72, 889.721; 228/157, 181, 193, 228/265; 244/45 R; 416/224, 241
See application file for complete search history.

(56) References Cited

U.S. PATENT DOCUMENTS

| 5,210,946 | A | * | 5/1993 | Monroe ................. 29/889.71 |
| 5,253,419 | A | * | 10/1993 | Collot et al. ............. 29/889.72 |
| 5,348,446 | A | * | 9/1994 | Lee et al. ................ 416/241 R |
| 5,603,449 | A | * | 2/1997 | Mansbridge et al. ........ 228/157 |
| 5,687,900 | A | * | 11/1997 | Zaccone et al. .......... 228/173.6 |
| 5,694,683 | A | | 12/1997 | Teets et al. |
| 5,975,465 | A | | 11/1999 | Donal et al. |
| 6,471,485 | B1 | | 10/2002 | Rossmann et al. |
| 6,705,011 | B1 | * | 3/2004 | Leibfried et al. ......... 29/889.72 |
| 6,871,398 | B2 | * | 3/2005 | Richardson et al. ...... 29/889.72 |
| 2001/0029668 | A1 | | 10/2001 | Schreiber |

FOREIGN PATENT DOCUMENTS

| EP | 0 893 342 A2 | 1/1999 |
| EP | 1 106 783 A2 | 6/2001 |
| EP | 1 338 353 A1 | 8/2003 |
| FR | 2 739 832 | 4/1997 |
| FR | 2 834 481 | 7/2003 |

* cited by examiner

*Primary Examiner*—Jermie E Cozart
*Assistant Examiner*—Alexander P Taousakis
(74) *Attorney, Agent, or Firm*—Oblon, Spivak, McClelland, Maier & Neustadt, L.L.P.

(57) ABSTRACT

A process for manufacturing reinforcing parts (14) for leading edges (10) and/or trailing edges (12) of fan blades (1) is described. In particular, this invention relates to the use of the SPF/DB (<<Super Plastic Forming/Diffusion Bonding >>) process for this type of non-hollow part.

15 Claims, 3 Drawing Sheets

PROCESS FOR MANUFACTURING A REINFORCING LEADING OR TRAILING EDGE FOR A FAN BLADE

TECHNICAL DOMAIN AND STATE OF THE ART

This invention relates to a process for manufacturing a metallic leading and/or trailing edge, designed for example to reinforce large code turbomachine fan blades.

Turbomachine fan blades undergo high mechanical stresses, particularly due to their rotation speed, while having to satisfy strict weight and size conditions. One of the options considered to reduce the weight of blades is to manufacture them from a composite material. However, turbomachine fan blades also have to satisfy severe usage criteria, particularly to resist impacts of foreign bodies. But the composite material, particularly on the edge of the blade, can break easily if it is very thin.

One means that has been considered for overcoming this problem is to consolidate the leading edge of fan blades made of a composite material by a metal part integrated into the aerodynamic profile of the blade. Such a metal reinforcing part, also called the consolidation leading edge or trailing edge, is then added, usually bonded, to the leading and/or trailing edge of the composite blade without altering its aerodynamic profile. This metal part is composed of a solid part several millimeters thick extended by two very thin lips (a few tenths of a millimeter thick) on its pressure surface and suction surface.

The invention is intended to make parts that could be used as a consolidation leading edge and/or a consolidation trailing edge for blades.

PRESENTATION OF THE INVENTION

One aspect of the invention used to overcome problems inherent to the development of machining techniques to make a consolidation edge with a complex geometry, relates to a process for making a reinforcing leading edge and/or trailing edge including the manufacture of a hollow envelope and then cutting the envelope to obtain the required part. Preferably, the envelope is made using the <<diffusion bonding and super plastic forming>> technique, possibly including bending-twisting. Cutting is preferably done by laser or pressurized jet. It may be desirable to machine the edge thus formed.

According to another aspect, the invention relates to the use of the diffusion bonding and super plastic forming process for making parts with the shape of reinforcing edges, and more particularly consolidation trailing and/or leading edges for blades.

BRIEF DESCRIPTION OF THE FIGURES

The specific features and advantages of the invention will be better understood after reading the following description with reference to the appended figures, given for illustrative purposes and that are in no way limitative, wherein:

FIG. 3 diagrammatically illustrates steps for manufacturing a consolidation leading edge according to the invention.

DETAILED PRESENTATION OF PARTICULAR EMBODIMENTS

Figure 1A:
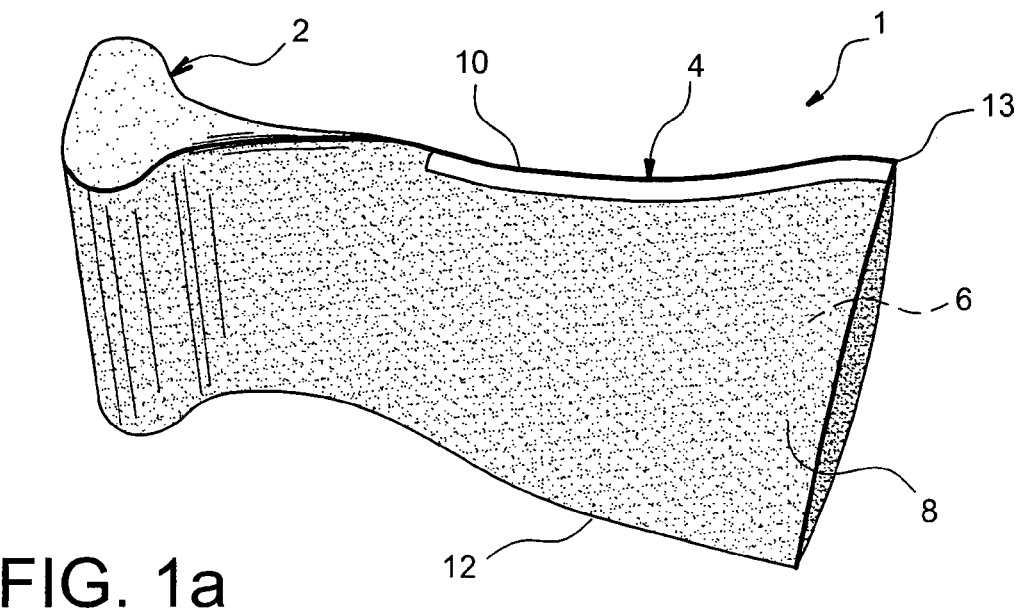
FIG. 1a shows a turbomachine blade.

FIG. 1a shows a blade 1, of the fan rotor blade type with a large chord. This type of blade has a complex geometry and comprises a root 2 prolonged by a tip 4 in a radial direction. The tip 4 that will be placed in the airflow circulation annulus of a turbomachine, is provided with two outer surfaces, called the suction surface 6 and the pressure surface 8, connected by a leading edge 10 and a trailing edge 12. Typically, the length between the leading edge 10 and the trailing edge 12 is of the order of 600 mm. Reinforcements 13 may be necessary on the trailing edge 12, and particularly on the leading edge 10, to prevent or simply retard their deterioration, particularly in the case of an impact.

These reinforcements 13 may be formed directly on the blade during its manufacture, for example by molding of metal. However, this solution is not always possible or even desirable, for example when two different materials are chosen for the blade and the reinforcement. In particular, in the case of blades made of a composite material, reinforcement of the leading edge and/or trailing edge made of metal, for example titanium alloy, will be made separately. This type of consolidation edge 14 is then added onto the blade 1, matching its shape as close as possible so as to not modify its mechanical and aerodynamic properties.

Figure 1B:
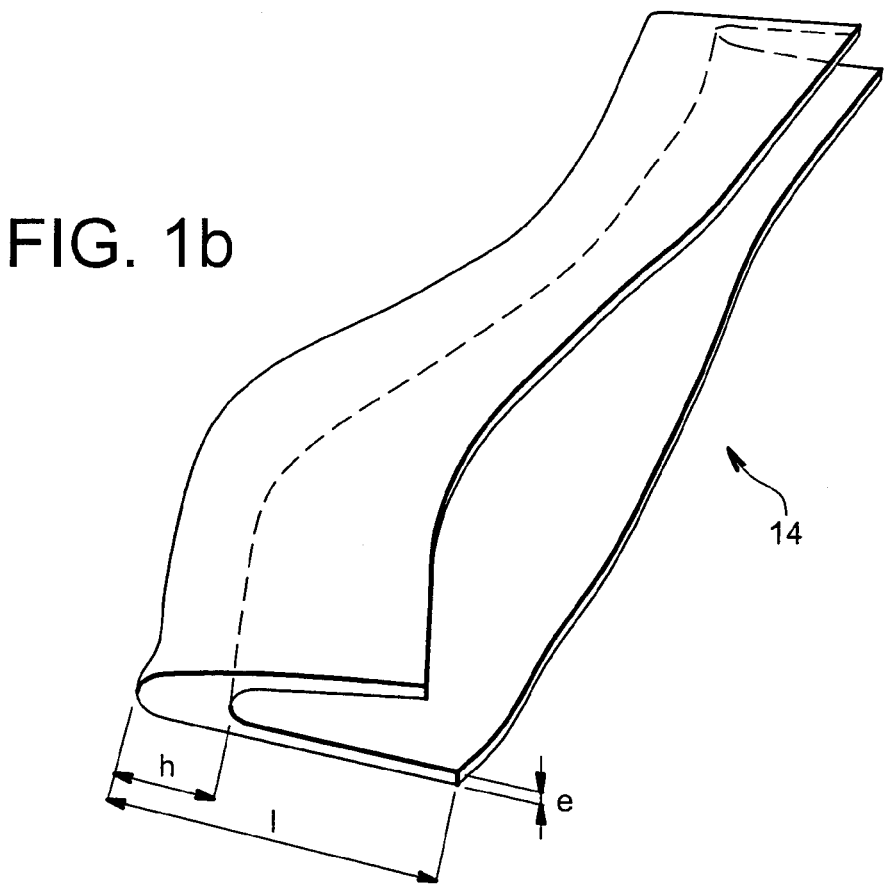
FIG. 1b shows a reinforcing leading edge for such a blade.

After seeing the geometry of the blade presented on FIG. 1a, it can quickly be deduced that the profile of the reinforcing edge 14 will also have a complex design. Furthermore, since the aerodynamic properties have to be maintained and the weight remains a constant concern, the required dimensions for the reinforcing edge 14 add additional constraints. FIG. 1b shows such a geometry for a consolidation leading and/or trailing edge 14 for a large code turbomachine fan blade, this blade being made of a composite material or other material. For example, the dimensions of such a reinforcing leading edge 14 could be a coverage length l of the order of 100 to 150 mm, preferably 130 mm, a height h of the solid part of the reinforcement of the order of 50 to 60 mm, and a wall thickness e of the lips less than 2 mm, if possible of the order of 0.5 mm, over most of its length (l–h).

Figure 2:
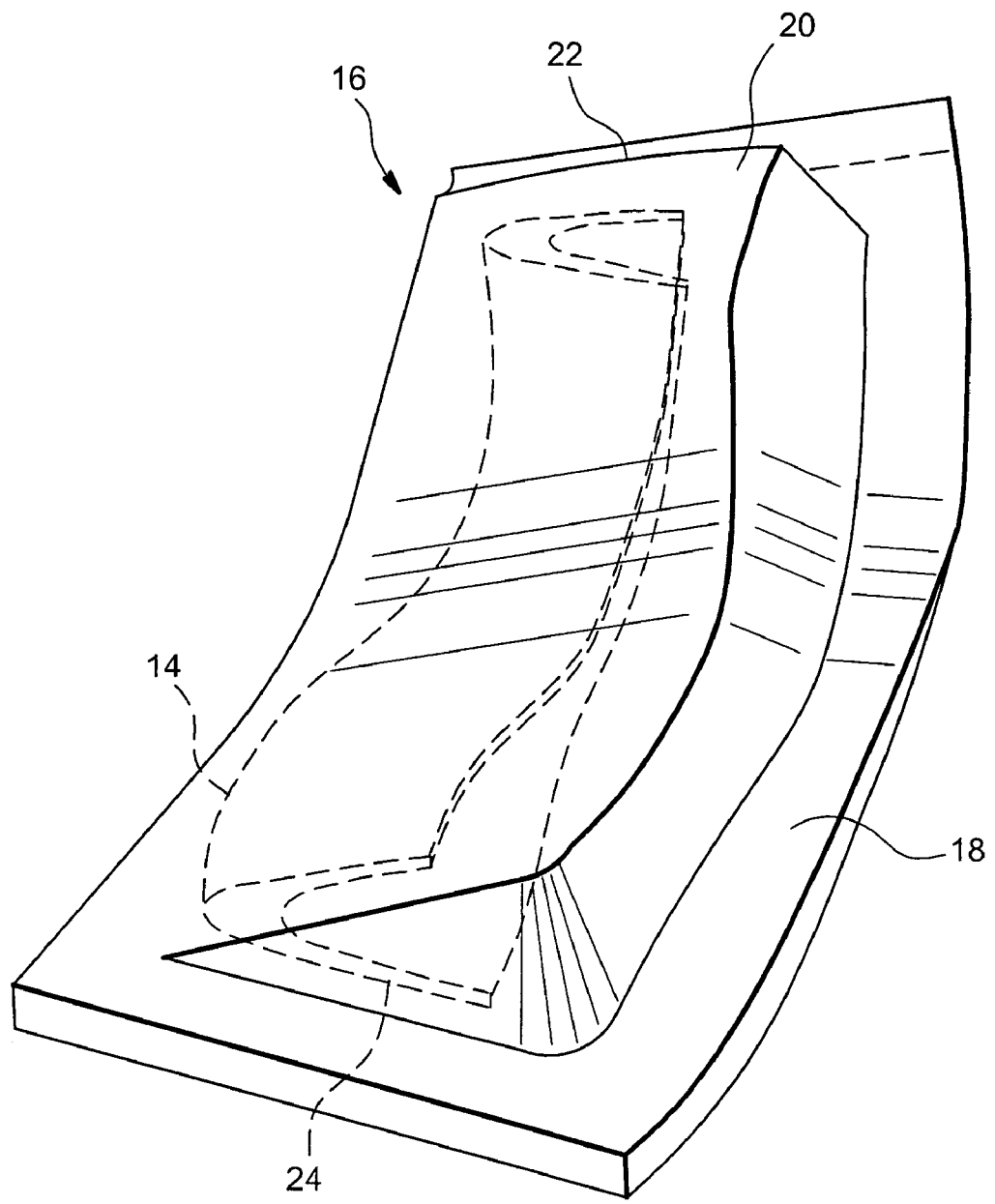
FIG. 2 diagrammatically shows a perspective view of the edge envelope shown in FIG. 1b, as modeled or made by SPF/DB.

According to the invention, the choice for manufacturing such a complex profile is to use an intermediate product that a priori is more complex to make: an envelope 16 of the reinforcing leading edge 14, which is generally hollow. With reference to FIG. 2, the envelope 16 comprises a periphery formed from the leading edge 14 and additional parts 18, this periphery defining an inner cavity 20. The advantage of defining such an envelope 16 is to use hollow parts manufacturing processes followed by cutting out the hollow part 16 to extract the reinforcing leading edge 14.

In particular, a manufacturing process is known and is described for example in document EP-A-1 338 353, for making complex hollow geometries, namely the SPF/DB<<Super Plastic Forming/Diffusion Bonding>> process used particularly in aeronautics.

The first step consists of modeling the consolidation leading edge profile 14, for example as shown in FIG. 1b, to obtain a part or envelope 16 that can be made by SPF/DB, for example as shown in FIG. 2. One of the possibilities consists of using the computer assisted design (CAD) or modeling, for example by virtually cutting the leading edge 14 into transverse sections normal to a dummy longitudinal axis defined in the design. These sections are then modified so as to obtain closed internal sections and then combined to obtain a hollow envelope 16. It is clear that other techniques known to those skilled in the art could be used.

Figure 3A:
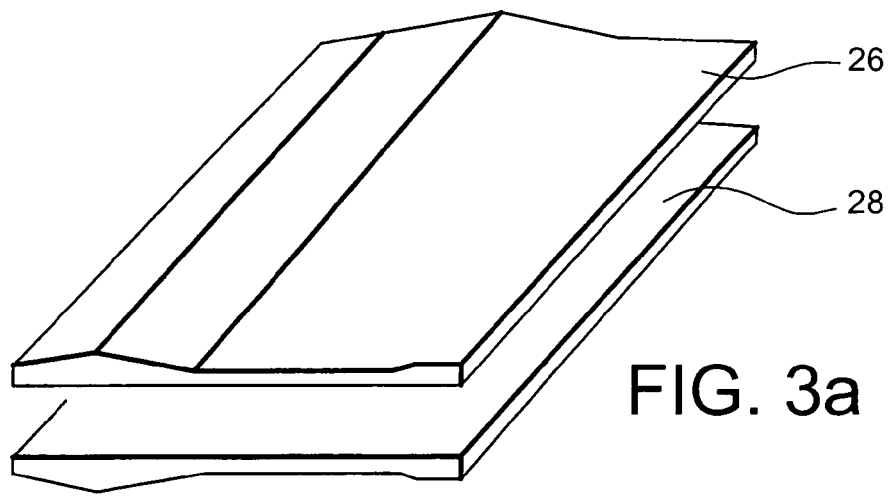
FIG. 3a shows the primary parts forming the leading edge.

A so-called <<flattening>> operation then consists of flattening the pressure surface 22 and the suction surface 24 of this closed envelope 16 of the leading edge 14, onto the same plane. This flattening operation may also be done by simulation, using CAD means, for example in three phases, deflation followed by detwisting and straightening then the real flattening. The design of the primary parts 26, 28 is deduced from this flattening, in a usual manner with two parts for this type of profile diagrammatically shown in FIG. 3*a*.

The primary parts 26, 28 making up an edge are then machined, usually from a rolled or forged plate. The thickness of the plate may be equal to half the thickness of the consolidation leading or trailing edge to be manufactured; preferably, the plate is made of a titanium alloy, for example TiAlV, but any metal or alloy with properties satisfying the required use and that could be used with the SPF/DB technique, might be chosen. Different plates, or even variable thickness plates, could also be used for the pressure surface 22 and the suction surface 24, for which the sum of the thicknesses is at least equal to or is greater than the maximum thickness of the reinforcing leading edge 14. Machining consists of distributing the thicknesses of each primary part 26, 28 making up the reinforcing leading or trailing edge according to the definition provided by CAD. Tools such as CAPM (computer aided design/computer aided manufacturing), and any technique known to those skilled in the art, may be used.

Figure 3B:
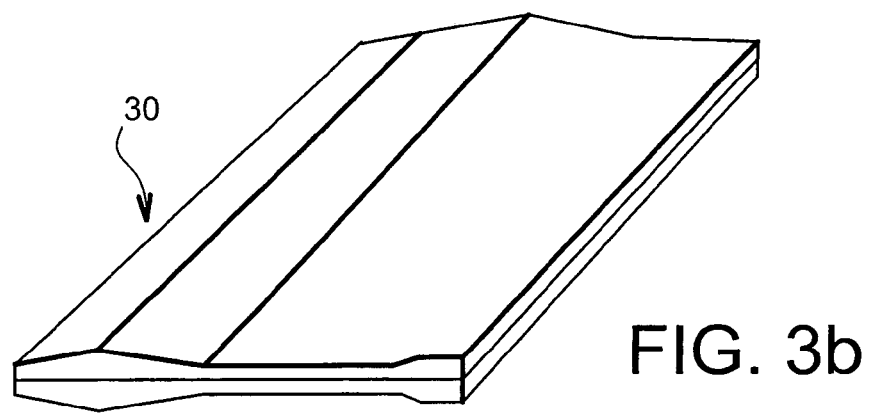
FIG. 3b shows the primary parts during the assembly step followed by diffusion bonding.

With the primary parts 26, 28 thus machined, the next step is diffusion bonding so as to form the preform 30 shown in FIG. 3*b*. For example, <<perfect>> cleaning of primary parts 26, 28 is done; the next step is the application of an anti-diffusion product on an internal face of at least the primary parts, according to a predefined pattern, for example by a silk-screen printing process. This anti-diffusion product is baked and the primary parts 26, 28 are assembled in a preform 30.

For example, the parameters chosen for diffusion bonding for a consolidation leading edge 14 made of a titanium alloy for a large chord turbomachine fan blade 1 made of a composite material, could be as follows: temperature equal to 875° C. to 940° C. at a pressure of 3 to 6 MPa for at least one hour. Diffusion bonding may be done by applying mechanical or isostatic pressure on a press fitted with appropriate tooling; it is preferably made in a chamber for thermomechanical treatment under isostatic pressure, using an inert gas like argon, called an HIP (<<Hot Isostatic Pressure>>) chamber. The purpose of this operation is diffusion bonding of internal metal parts not coated with a diffusion product to each other.

Advantageously, the diffusion bonding operation may be combined with shaping in the case of welding on press. The purpose of shaping is to improve positioning of the bonded preform on the inflation mould used for the inflation and super plastic forming operation.

After diffusion bonding, a bending and twisting step can be carried out on the preform 30. This step may also be combined with diffusion bonding.

Figure 3C:
FIG. 3c shows the envelope obtained from inflation and super plastic forming.

The preform 30 derived from diffusion bonding is then placed in inflation equipment so that super plastic forming is applied to it. For example, it can be done at between 850° C. and 940° C. at a pressure of between 2 and 6 MPa of argon. This step may be combined with diffusion bonding, possibly coupled to bending-twisting. The part derived from this process corresponds to the envelope 16 of the reinforcing leading edge 14 illustrated diagrammatically in FIG. 3*c*, and also shown on FIG. 2.

Note that up to this point, these steps are similar to the steps for manufacturing a hollow fan blade by SPF/DB, for which one example use is described in document FR-A-2 834 481: The process according to the invention also provides a means of reducing manufacturing costs for these sensitive parts of the blades, by the use of known tooling and existing know how.

Figure 3D:
FIG. 3d shows a cross-section through the leading edge after cutting.

Finally, the envelope 16 is cut-out to obtain a reinforcing leading edge 14 itself as shown diagrammatically on FIG. 3*d*. The cut-out may be done by any technique known to those skilled in the art; laser cutting and high pressure waterjet cutting are recommended.

It may be useful afterwards to do a finishing machining step, particularly polishing of the resulting edge 14. Furthermore, in order to optimize the complementarity between the reinforcing leading edge 14 and the leading edge of the blade 10; it may be preferable to adjust the dimensions. Generally, once made, the consolidation leading edge 14 can be machined according to any technique known to those skilled in the art, and particularly chemical and/or mechanical machining could be considered to decrease the thickness of the pressure surface and the suction surface.

The invention claimed is:

1. A process for manufacturing a consolidation leading edge to be added to a leading edge of a turbomachine fan blade so as to reinforce said leading edge, said process comprising the following steps:

manufacturing an envelope defining a cavity delimited by an inner surface of said envelope, wherein a portion of said inner surface forms an inner portion of said consolidation leading edge, wherein said inner portion is to be bonded to said leading edge of said turbomachine fan blade;

cutting the envelope through said cavity so as to obtain the consolidation leading edge, wherein said step of manufacturing of the envelope includes the following steps:

making primary parts;

diffusion bonding of the primary parts into a preform;

inflating the preform under gas pressure and super plastic forming of the envelope.

2. A process according to claim 1, wherein said step of cutting is performed by laser cutting and/or high pressure waterjet cutting.

3. A process according to claim 1, further comprising a step of bending and twisting the preform, after diffusion bonding.

4. A process according to claim 1, further comprising a step of machining the consolidation leading edge resulting from said cutting of the envelope.

5. A process for manufacturing a reinforcing edge to be added to an edge of a turbomachine fan blade, said process including the following steps:

making two primary parts;

diffusion bonding the primary parts into a preform;

inflating the preform under gas pressure and super plastic forming of an envelope defining a cavity;

laser cutting and/or high pressure waterjet cutting the envelope through said cavity to extract the reinforcing edge;

machining the extracted reinforcing edge.

6. A process according to claim 5, further comprising bending and twisting said preform.

7. A process for manufacturing a turbomachine blade, said process comprising:

manufacturing a reinforcing edge according to claim 5;

providing a turbomachine fan blade with a leading edge and a trailing edge; and reinforcing at least one edge from said leading edge and said trailing edge of said turbomachine fan blade by bonding said reinforcing edge onto said at least one edge.

8. A process according to claim 1, wherein said envelope has dimensions greater than said consolidation leading edge and smaller than said turbomachine fan blade.

9. A process according to claim 1, wherein said consolidation leading edge has a thickness of less than 2 mm.

10. A process according to claim 9, wherein said consolidation leading edge has a height of 50 to 60 mm.

11. A process according to claim 10, wherein said consolidation leading edge has a length of 100 to 150 mm.

12. A process for manufacturing a turbomachine blade, said process comprising:

provide a turbomachine blade with a leading edge; and
bonding said consolidation leading edge on said leading edge of said turbomachine blade.

13. A process according to claim 12, wherein said leading edge of said turbomachine blade and said consolidation leading edge are made of different materials.

14. A process according to claim 13, wherein said leading edge of said turbomachine blade is made of a composite material, and said consolidation leading edge is made of a metal.

15. A process according to claim 14, wherein said consolidation leading edge is made of a titanium alloy.

\* \* \* \* \*